(12) United States Patent
Satou

(10) Patent No.: US 7,265,661 B2
(45) Date of Patent: Sep. 4, 2007

(54) DISPLAY SYSTEM FOR VEHICLE AND METHOD OF CONTROLLING THE SAME

(75) Inventor: Masanori Satou, Atsugi (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 336 days.

(21) Appl. No.: 10/895,093

(22) Filed: Jul. 21, 2004

(65) Prior Publication Data
US 2005/0062848 A1    Mar. 24, 2005

(30) Foreign Application Priority Data
Jul. 22, 2003    (JP) ............... 2003-277679

(51) Int. Cl.
*H04N 5/225*    (2006.01)
(52) U.S. Cl. .............. 340/461; 348/208.6; 348/607
(58) Field of Classification Search ............. 348/607, 348/622, 208.99, 208.1, 208.6; 386/76; 340/465, 340/466, 438, 461
See application file for complete search history.

(56) References Cited

U.S. PATENT DOCUMENTS

| | | | | |
|---|---|---|---|---|
| RE31,078 | E * | 11/1982 | Segerstrom | 386/76 |
| 5,303,051 | A * | 4/1994 | Levesque et al. | 348/31 |
| 5,742,356 | A * | 4/1998 | Suzuki | 348/607 |
| 5,978,039 | A * | 11/1999 | Usui et al. | 348/553 |
| 5,986,720 | A * | 11/1999 | Kishigami et al. | 348/725 |
| 6,704,434 | B1 * | 3/2004 | Sakoh et al. | 382/104 |
| 6,734,896 | B2 * | 5/2004 | Nobori et al. | 348/148 |
| 2001/0019363 | A1 | 9/2001 | Katta et al. | |
| 2003/0169902 | A1 * | 9/2003 | Satoh | 382/104 |
| 2004/0189831 | A1 * | 9/2004 | Shibatani et al. | 348/240.99 |
| 2004/0212686 | A1 * | 10/2004 | Usami | 348/208.99 |

FOREIGN PATENT DOCUMENTS

| | | |
|---|---|---|
| CN | 2043947 U | 9/1989 |
| CN | 2043947 U | 9/1989 |
| EP | 0 560 314 A | 9/1993 |

OTHER PUBLICATIONS

"Toyota Land Cruiser" 100 New Model Instruction Manual: edited and issued by Toyota Motor Corporation: Aug. 5, 2002: pp. 4-98 to 4-115.

* cited by examiner

Primary Examiner—Jeffery Hofsass
Assistant Examiner—Anne V Lai
(74) Attorney, Agent, or Firm—McDermott Will & Emery LLP

(57) ABSTRACT

A display system for a vehicle is provided with a sensor sensing a traveling condition of a vehicle, an image pick-up device executing an image pick-up to take an image of an outside of the vehicle, a display displaying the image taken by the image pick-up device, an image irregularity determination section determining whether there is an image irregularity or not in the image taken by the image pick-up device based on the traveling condition of the vehicle sensed by the sensor, and a display control section executing a display control processing with respect to one of the image still containing the image irregularity and the image previously picked up and not containing the image irregularity when the image irregularity determination section determines that there is the image irregularity in the image.

13 Claims, 5 Drawing Sheets

US 7,265,661 B2

DISPLAY SYSTEM FOR VEHICLE AND METHOD OF CONTROLLING THE SAME

BACKGROUND OF THE INVENTION

The present invention relates to a display system for a vehicle and its related method, and more particularly to a display system for a vehicle and a method of controlling the same by which the difficulty of seeing images is reduced.

In recent years, technologies of taking an image of a view ahead of a vehicle at night by a near-infrared camera and providing a virtualized night-vision image to a driver of the vehicle through a head-up display (hereinafter referred to as HUD) have been developed (TOYOTA LAND CRUISER 100 New Model Instruction Manual: edited and issued by Toyota Motor Corporation: Aug. 5, 2002: pp. 4-96 to 115).

SUMMARY OF THE INVENTION

According to the study of the present inventor, however, in such an arrangement, the image taken by the infrared camera is displayed simply as it is. Consequently, for example, when the vehicle turns, an image irregularity occurs due to so-called image blurring, image flowing or the like. This makes the driver of the vehicle difficult in seeing the image and is likely to make him uncomfortable.

The present invention has been completed upon such studies conducted by the present inventor and has an object to provide a display system for a vehicle and a method of controlling the same by which the difficulty of seeing images and the resulting discomfort which a driver of the vehicle may have can be relieved.

In order to achieve this object, according to one aspect of the present invention, a display system for a vehicle comprises: a sensor sensing a traveling condition of a vehicle; an image pick-up device executing an image pick-up to take an image of an outside of the vehicle; a display displaying the image taken by the image pick-up device; a memory storing a first image taken by the image pick-up device at a first time and a second image taken by the image pick-up device at a second time which is past the first time; an image irregularity determination section determining whether there is an image irregularity or not in the second image stored in the memory based on the traveling condition of the vehicle sensed by the sensor; and a display control section executing a display control processing to allow the first image stored in the memory to be displayed on the display when the image irregularity determination section determines that there is the image irregularity in the second image.

On the one hand, according to another aspect of the present invention, a display system for a vehicle comprises: a sensor sensing a traveling condition of a vehicle; an image pick-up device executing an image pick-up to take an image of an outside of the vehicle; a display displaying the image taken by the image pick-up device; an image irregularity determination section determining whether there is an image irregularity or not in the image taken by the image pick-up device based on the traveling condition of the vehicle sensed by the sensor; and a display control section executing a display control processing with respect to the image still containing the image irregularity when the image irregularity determination section determines that there is the image irregularity in the image.

Besides, according to another aspect of the present invention, a method of controlling a display system for a vehicle comprises: detecting a traveling condition of a vehicle; picking up an image of an outside of the vehicle; determining whether there is an image irregularity or not in the image based on the traveling condition of the vehicle; and executing display processing to display one of the image still containing the image irregularity and the image previously picked up and not containing the image irregularity, on a display, when the image is determined as having the image irregularity.

Other and further features, advantages, and benefits of the present invention will become more apparent from the following description taken in conjunction with the following drawings.

DETAILED DESCRIPTION OF THE PREFERRED EMBODIMENTS

A display system for a vehicle and a method of controlling the same in each of the embodiments according to the present invention will be hereinafter described in detail with reference to FIGS. 1 to 6.

First Embodiment

First, a display system for a vehicle and a method of controlling the same of a first embodiment according to the present invention will be described in detail with reference to FIGS. 1 to 4.

Figure 1A:
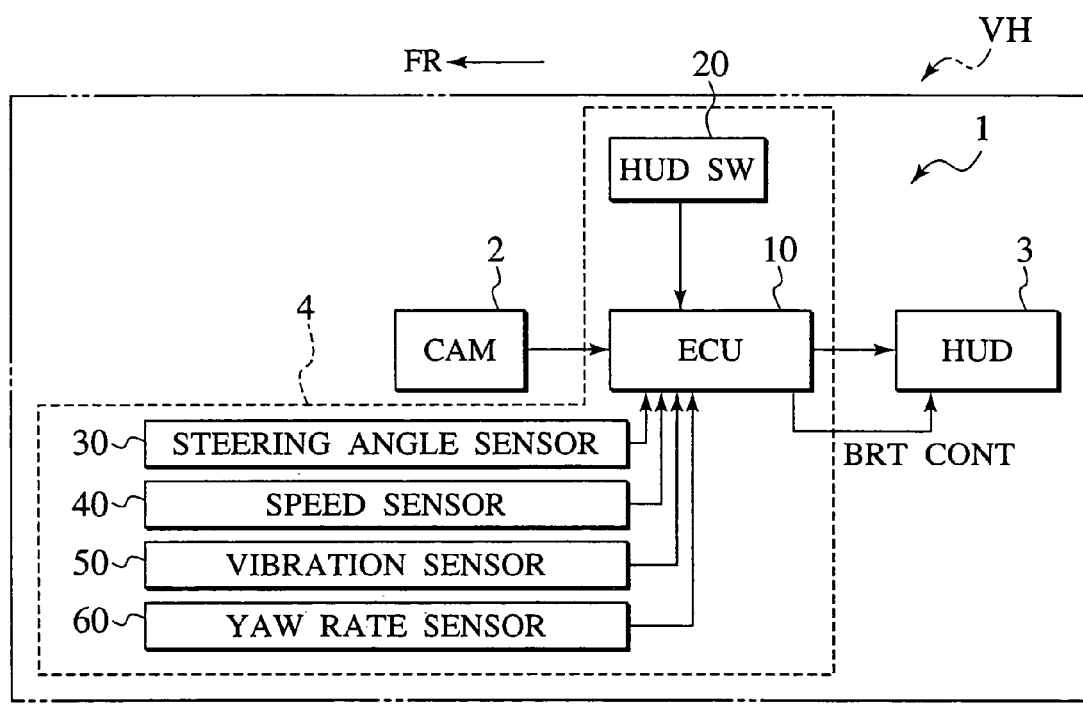
FIG. 1A shows a schematic block diagram of a display system for a vehicle including a display control apparatus for a vehicle of a first embodiment according to the present invention.
Figure 1B:
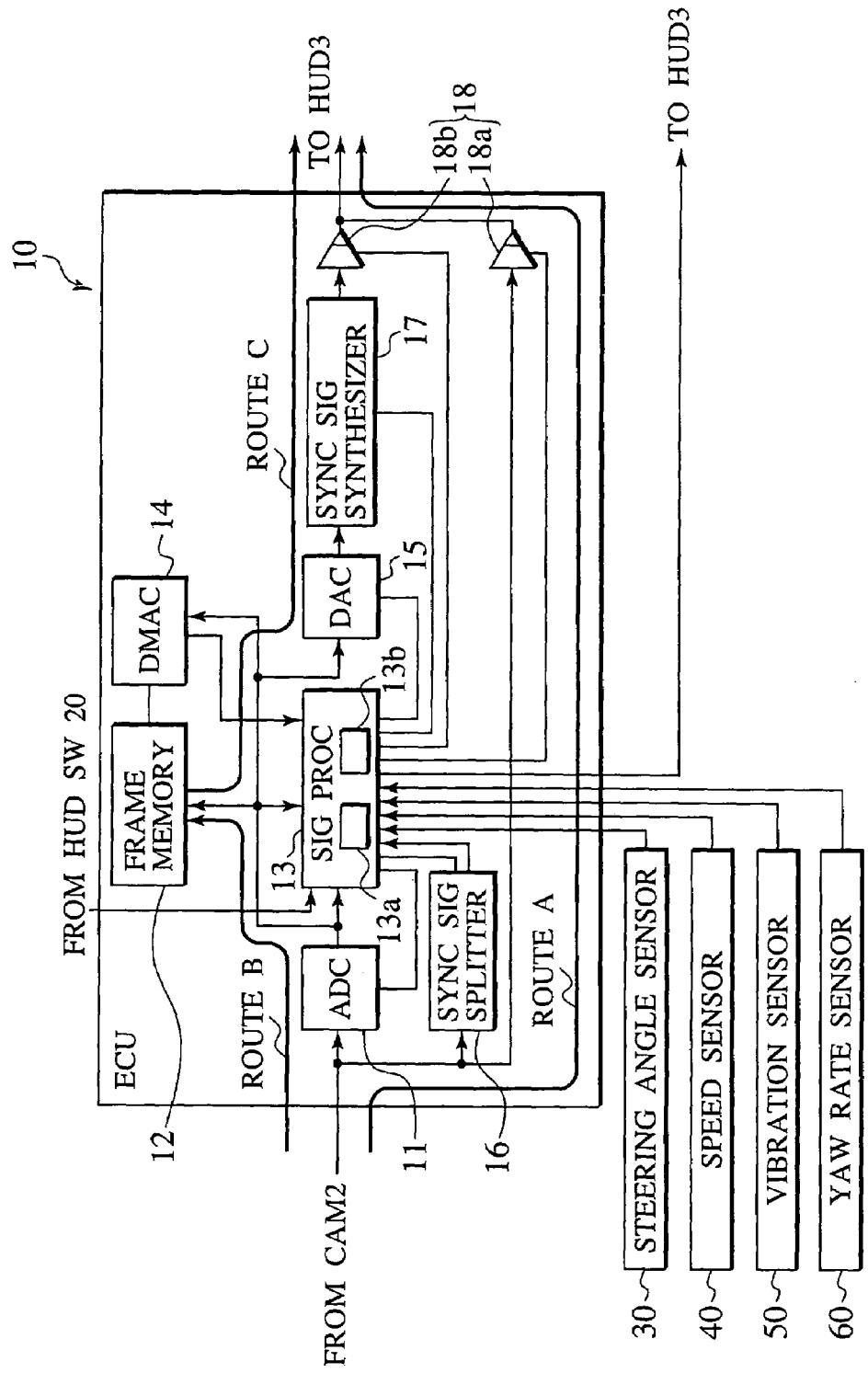
FIG. 1B shows a schematic block diagram of the display control apparatus for the vehicle of the presently filed embodiment.

FIG. 1A shows a schematic block diagram of a display system for a vehicle including a display control apparatus for a vehicle of the presently filed embodiment, and FIG. 1B shows a schematic block diagram of the display control apparatus for the vehicle of the presently filed embodiment.

As shown in FIG. 1A, a display system 1, which is mounted in the vehicle VH, is provided with a camera (image pick-up device) 2, such as a near infrared camera, a far infrared camera and a visible-light camera, which picks up an image of a view, typically a view in front of the vehicle, an HUD (head-up display) 3 which visibly provides the image taken by the camera 2 to a driver and a passenger in the vehicle, and a display control apparatus 4 which performs controls to display the image taken by the camera 2 on the HUD 3. Incidentally, in FIG. 1A, an arrow FR indicates a frontward direction of the vehicle.

The display control apparatus 4 includes an ECU (electronic control unit) 10 which controls the entire display system 1, and an HUD switch 20 which is used for determining a control method in the ECU 10. The display control apparatus 4 also includes a steering angle sensor 30 which senses the amount of steering of the vehicle, a speed sensor 40 which senses speeds of the vehicle, a vibration sensor 50 which senses vibrations of the vehicle, e.g. acceleration or the like, and a yaw rate sensor 60 which senses the amount of lateral fluctuation of the vehicle, e.g. a yaw rate based on angular velocity or the like.

In the display control apparatus 4, for example, when an image irregularity occurs, the ECU 10 determines a display control method for the image taken by the camera 2, based on signals from the HUD switch 20, and executes processing in accordance with the control method. Here, the image irregularity occurs when, for instance, the vehicle is turning or running on a rough road, and the ECU 10 determines whether there is an image irregularity or not, based on signals from the steering angle sensor 30, the speed sensor 40, the vibration sensor 50, and the yaw rate sensor 60. The ECU 10 also has a function of judging whether there is an image irregularity or not by image processing, not based on such various sensor signals. Further, the signals from the HUD switch 20 may be generated by the operation of the driver or the like or may be automatically generated under predetermined conditions.

As shown in FIG. 1B, the ECU 10 includes an ADC (analog-digital converter) 11 which converts analog signals from the camera 2 to digital signals, a frame memory 12 which stores data on the taken image converted to the digital signals, and a signal processor 13 which executes signal processing, apparatus control and the like. The signal processor 13 has an image irregularity determination section 13a which determines (detects) whether there is an image irregularity or not in the image taken by the camera 2, and a display control section 13b which controls the displaying of the taken image on the HUD 3 based on the determination (detection) result.

Also, the ECU 10 includes a DMAC (direct memory access controller) 14 to store the data on the taken image into the frame memory 12 without intervening the signal processor 13, and a DAC (digital-analog converter) 15 which converts the digital data on the taken image stored in the frame memory 12 to analog signals.

Further, the ECU 10 includes a synchronization signal splitter 16 which splits synchronization signals from the analog signals of the camera 2 and outputs the split synchronization signals to the signal processor 13, a synchronization signal synthesizer 17 which synthesizes the synchronization signals split by the synchronization signal splitter 16, and buffers (buffer circuits) 18 (18a, 18b) which perform switching of signals to be outputted to the HUD 3.

In the ECU 10, each of the components 11 to 18 includes, as electrical signal lines, a route A by which the data on the taken image from the camera 2 is outputted to the HUD 3 as it is through the buffer 18a, a route B by which the data on the taken image from the camera 2 reaches the frame memory 12 through the ADC 11, and a route C by which the data on the taken image stored in the frame memory 12 is outputted to the HUD 3 through the DAC 15, the synchronization signal synthesizer 17 and the buffer 18b.

Signals from the various sensors 30 to 60 are inputted to the signal processor 13, which, based on these signals, determines an image irregularity which may occur when, for example, the vehicle is turning. Signals from the HUD switch 20 are also inputted to the signal processor 13, and when an image irregularity is detected, the signal processor 13 determines whether to output the data on the taken image through the route A or the route C by switching the buffer 18 based on the signals from the HUD switch 20. Further, the signal processor 13 is connected directly to the HUD 3 without the above-mentioned intervenient components 11 to 18, and adjusts the brightness of display on the HUD 3 when the image irregularity is detected.

Figure 2:
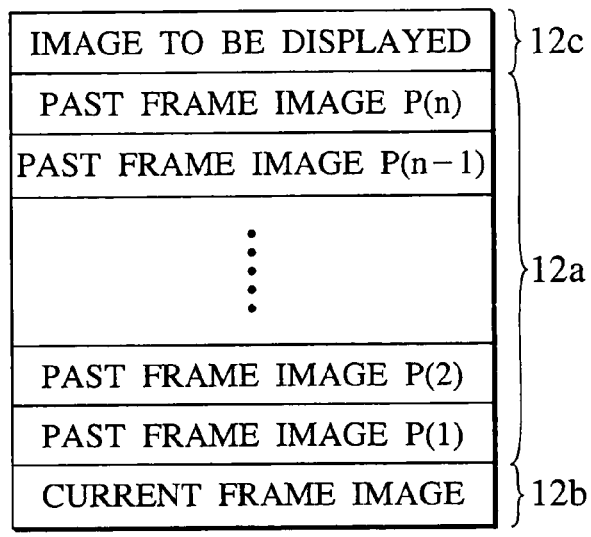
FIG. 2 is an explanatory diagram showing a schematic configuration of a frame memory in the display control apparatus for the vehicle of the presently filed embodiment.

FIG. 2 is an explanatory diagram showing a schematic configuration of the frame memory 12 in the display control apparatus 10 of the presently filed embodiment.

As shown in FIG. 2, the frame memory 12 has areas to store (n+2) frames of image data (n is an integer which is equal to or more than 1). As areas to store image data, it has a past image memory area (a first memory area) 12a to store the past n frames of image data, a current image memory area (a second memory area) 12b to store data on the image taken at the time when a predetermined time has elapsed since the time when the past n frames of the image data were taken (image data as the current frame), and a display image memory area (a third memory area) 12c to store data on an image to be displayed on the HUD 3.

Figure 3:
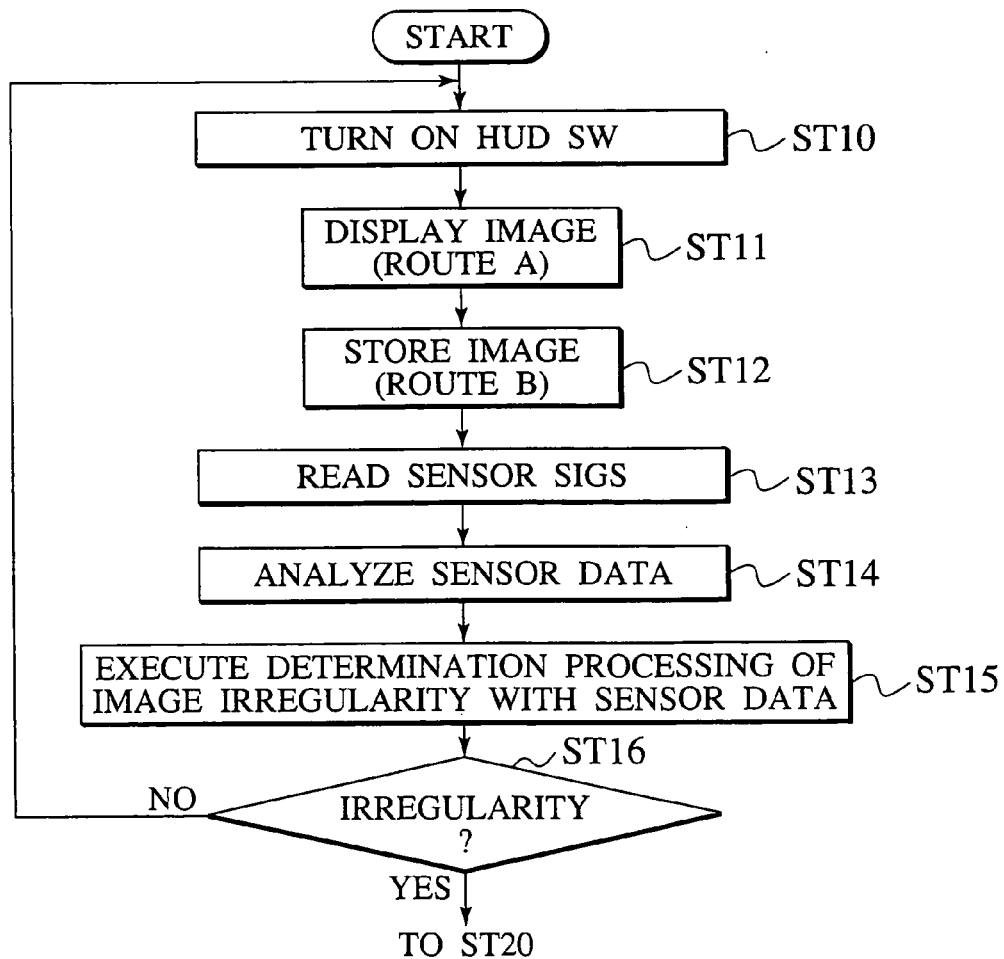
FIG. 3 is a flow chart showing a basic processing of the display control apparatus for the vehicle of the presently filed embodiment.

FIG. 3 is a flow chart showing the basic processing executed mainly by the image irregularity determination section 13a of the signal processor 13 in the display control apparatus 4 of the presently filed embodiment.

As shown in FIG. 3, when the HUD switch 20 is turned on first, the signal processor 13 determines a control method M for irregular images based on the signals from the HUD switch 20 (ST 10) since they contain information to determine the control method M when the image irregularity occurs. Incidentally, the control method M for the irregular images will be later described in detail.

The signal processor 13 then provides the HUD 3 with the image data from the camera 2 through the buffer 18a. That is, the signal processor 13 selects the route A. This causes the image obtained by the camera 2 to be displayed, as usual, on the HUD 3 as it is (ST11).

Then, the process of the route B is executed to store the image data from the camera 2 into the frame memory 12. At this time, the frame memory 12 stores the image data into the current image memory area 12b, while transferring the image data previously stored in the current image memory area 12b to the past image memory area 12a as a past frame image P(1) and storing such a past frame image P(1) into the past image memory area 12a (ST12).

The signal processor 13 then reads the signals from various sensors 30 to 60 (ST13), analyzes the signals from the various sensors 30 to 60 (ST14), and executes determination processing of image irregularity with such sensor data (ST15).

Figure 4:
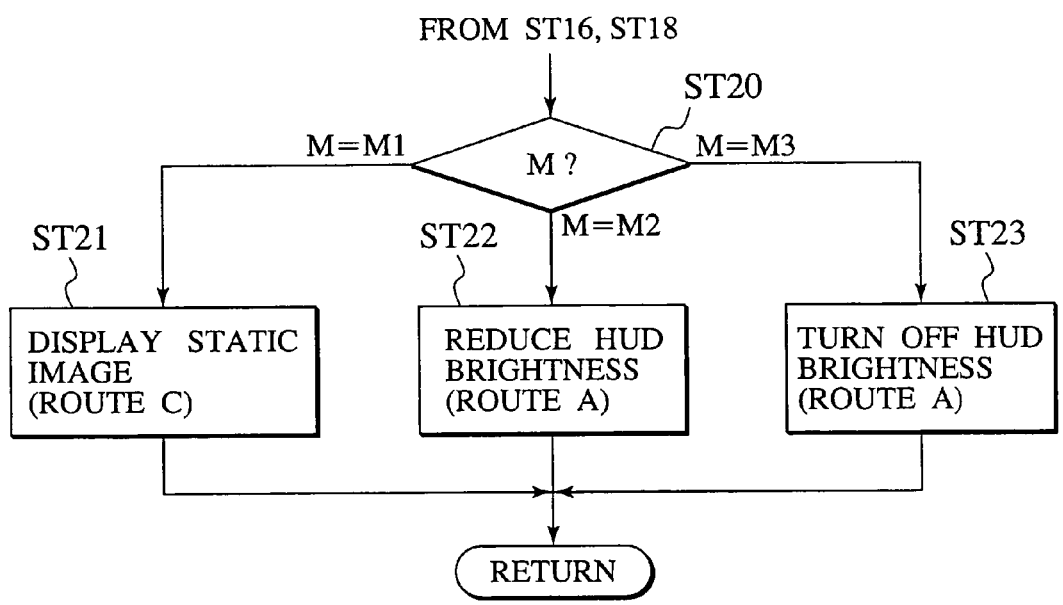
FIG. 4 is a flow chart showing a display control processing of the display control apparatus for the vehicle executed when an image irregularity is detected in the presently filed embodiment.

As a result, a determination is made as to whether the image stored in the current image memory area 12b has an irregularity or not. When an image irregularity is detected, the processing as shown in FIG. 4 is executed (ST16). Then, the processing as shown in FIG. 4 is completed, and the process returns to ST10, wherein such a sequence of processes are repeated until, for example, the ignition switch is turned off.

On the other hand, when no image irregularity is detected in the image stored in the current image memory area 12b, the process automatically returns to ST10 (ST16).

FIG. 4 is a flow chart showing the display control processing executed mainly by the display control section 13b of the signal processor 13 when an image irregularity is detected in the presently filed embodiment.

As shown in FIG. 4, the signal processor 13 first discriminates the control method M determined at ST10 in FIG. 3 (ST20).

If it is discriminated that a control method M1 is determined to be carried out (ST20: M=M1), the signal processor 13 performs such a control as to have the image stored in the past image memory area 12a displayed on the HUD 3 (ST21). More particularly, if it was determined that the control method was to be M1, inside of the frame memory 12, the image data in the past image memory area 12a, e.g. the past frame image P(1) is also transferred to and stored in the display image memory area 12c, and this image data is provided to the HUD 3 through the route C, so that the image corresponding to the past frame image P(1) is displayed.

This allows the image before the occurrence of image irregularity to be displayed on the HUD 3, thereby relieving the difficulty of seeing and discomfort which the driver of the vehicle may have. Thereafter, the process returns to the basic operation shown in FIG. 3.

If it is discriminated that the control method M2 is determined to be carried out (ST20: M=M2), the signal processor 13 performs such a control as to have the image obtained by the camera 2 displayed on the HUD 3 and also reduce the brightness of an image that is displayed (ST22). More particularly, if it was determined that the control method was to be M2, the signal processor 13 provides the image data to the HUD 3 through the route A, as well as giving a command to reduce the brightness of the image displayed on the HUD 3.

This makes the image having the image irregularity less noticeable, thus relieving the difficulty of seeing and discomfort which the driver of the vehicle may have. Thereafter, the process returns to the basic operation shown in FIG. 3.

If it is discriminated that the control method M 3 is determined to be carried out (ST20: M=M3), although the signal processor 13 performs a control to have the image obtained by the camera 2 displayed on the HUD 3, it also performs a control to prohibit the image to be displayed from being displayed (ST23). More particularly, if it was determined that the control method was to be M3, the signal processor 13 provides the image data to the HUD 3 through the route A, while giving a command to null the brightness of the image to be displayed so that no image is displayed (brightness is set to be zero).

This keeps the image having an image irregularity from being displayed, thus relieving the difficulty of seeing and discomfort which the driver of the vehicle may have. Thereafter, the process returns to the basic operation shown in FIG. 3.

In addition to the above-mentioned control methods, the following control method may be adopted as one utilizing the frame memory 12.

That is, if the signal processor 13 detects an image irregularity, a control which has the taken image displayed on the HUD 3 at predetermined time intervals may be carried out until no irregularity is detected. In such case, inside of the frame memory 12, the image data in the current image memory area 12b is also transferred to and stored into the displayed image memory area 12c, and this image data is provided to the HUD 3 through the route C for a predetermined time period, so that the corresponding data is displayed for the predetermined time period.

When the predetermined time period has elapsed, again, the signal processor 13 determines whether there is an image irregularity or not at an elapse point of the predetermined time period. If there is the image irregularity, the frame memory 12 again stores the data on the image taken at the elapse point of the predetermined time period into the current image memory area 12b and also transfers the image data in the current image memory area 12b to the displayed image memory area 12c to store it therein so as to provide it to the HUD 3 through the route C for the predetermined time period.

Thereafter, the above-described processes are repeated until it is determined that there is no image irregularity. This allows the image having an image irregularity to be displayed at predetermined time intervals, thereby making the image irregularity less noticeable. As a result, the difficulty of seeing and discomfort which the driver of the vehicle may have are relieved.

Besides, hereinafter, concerning the determination processing of image irregularity with sensor data (ST15, ST16) shown in FIG. 3, first to third methods will be described in more detail.

The display control apparatus 4 of the presently filed embodiment includes the steering angle sensor 30, the speed sensor 40, the vibration sensor 50 and the yaw rate sensor 60, and determines an image irregularity based on specific signals from these sensors 30 to 60.

First, a first method in the determination processing of image irregularity with such sensor data will be described.

In the first method, an image irregularity (image lateral flowing) IR is determined based on a turning radius and a vehicle speed of the vehicle VH. To be more precise, an image irregularity is determined based on the following relational equation (1), where parameter P1 is a turning radius, parameter P2 is a vehicle speed, C is a coefficient and TH is a threshold. Incidentally, the amount of steering obtained by the steering angle sensor 30 can be used in place of the turning radius.

$$IR = P1/P2 \times C \leq TH \tag{1}$$

Assuming in this relational equation (1) that the coefficient C is 1 and the threshold TH is 1, it can be concluded, as shown in Table 1 below, that there is an image irregularity when the values in Table 1 is equal to or less than 1. This assumes that even though the speed is low, image flowing (image irregularity) occurs when the turning radius is small.

Further, if the threshold TH is fixed to one value, i.e., the value of 1, the IR value calculated from the relational equation (1) may show fluctuations around 1 in such a manner that a state where the IR value becomes greater than 1 and a state where the IR value becomes less than 1 are alternately plurally repeated in a short time period. If this takes place, an image to be displayed may become unstable. Thus, as shown in Table 1, the threshold TH is made to exhibit a kind of hysteresis. That is, an appropriate difference is provided between the rate of change (gradient) of each of the parameters P1 and P2 in the direction that it exceeds or falls below the threshold TH of 1 and the rate of change (gradient) of each of the parameters P1 and P2 in the direction that it changes toward the threshold TH of 1. With such hysteresis, an image to be displayed does not become unstable even if the IR value fluctuates around the threshold TH.

Incidentally, the values of the coefficient C and threshold TH are not limited to 1 and may be set to other values taking into account differences in the system configuration, vehicle type and the like.

TABLE 1

| | | Turning Radius/Steering Amount (PI) | | | | | | | | | |
|---|---|---|---|---|---|---|---|---|---|---|---|
| | | 10 | 20 | 30 | 40 | 50 | 60 | 70 | 80 | 90 | 100 |
| Vehicle Speed (P2) | 10 | 1 | 2 | 3 | 4 | 5 | 6 | 7 | 8 | 9 | 10 |
| | 20 | 0.5 | 1 | 1.5 | 2 | 2.5 | 3 | 3.5 | 4 | 4.5 | 5 |
| | 30 | 0.33 | 0.66 | 1 | 1.5 | 1.66 | 2 | 2.3 | 2.6 | 3 | 3.33 |
| | 40 | 0.25 | 0.5 | 0.75 | 1 | 1.25 | 1.5 | 1.75 | 2 | 2.25 | 2.5 |
| | 50 | 0.2 | 0.4 | 0.6 | 0.8 | 1 | 1.2 | 1.4 | 1.6 | 1.8 | 2 |
| | 60 | 0.16 | 0.33 | 0.5 | 0.66 | 0.83 | 1 | 1.16 | 1.32 | 1.5 | 1.66 |
| | 70 | 0.14 | 0.28 | 0.42 | 0.57 | 0.71 | 0.85 | 1 | 1.14 | 1.28 | 1.42 |
| | 80 | 0.12 | 0.25 | 0.37 | 0.5 | 0.62 | 0.75 | 0.875 | 1 | 1.125 | 1.25 |
| | 90 | 0.11 | 0.22 | 0.33 | 0.44 | 0.55 | 0.66 | 0.77 | 0.88 | 1 | 1.11 |
| | 100 | 0.1 | 0.1 | 0.3 | 0.4 | 0.5 | 0.6 | 0.7 | 0.8 | 0.9 | 1 |

Next, a second method in the determination processing of image irregularity with sensor data will be described.

In the second method, an image irregularity is determined based on signals from the yaw rate sensor 60. In general, yaw rate sensors are designed so as to exhibit a large output value when a turning radius is small even though the speed of a vehicle is slow and to exhibit a large output value when the speed of a vehicle is fast even though a turning radius is large. Therefore, using such output values will produce the same result as in the first method.

To be more precise, in the second method, an image irregularity IR is determined based on the following relational equation (2), where parameter P3 is the amount of lateral fluctuation of the vehicle such as angular velocity detected by the yaw rate sensor 60, and threshold TH2 is a value obtained and derived by means of vehicle testing taking in consideration of both vehicle characteristics and sensor characteristics. For example, with the yaw rate sensor 60 being of a type which outputs voltage and if, as a result of testing, an image irregularity is detected at 1 V or more and not detected at less than 1 V, the threshold TH2 will be set as 1 V. Incidentally, it is preferred that the threshold TH2 also be made to have hysteresis as described in the first method.

$$IR = P3 \geq TH2 \quad (2)$$

Next, a third method in the determination processing of image irregularity with sensor data will be described.

In the third method, an image irregularity (blurring due to camera shake) is determined based on signals from the vibration sensor 50. To be more precise, an image irregularity IR is determined based on the following relational equation (3), where parameter P4 is the amount of vibration such as vertical acceleration of the vehicle detected by the vibration sensor 50. Also, the threshold TH3 is a value obtained and derived by means of vehicle testing taking in consideration of both vehicle characteristics and sensor characteristics. For example, with the vibration sensor 50 being of a type which outputs voltage and if, as a result of testing, an image irregularity is detected at 1 V or more and not detected at less than 1 V, the threshold TH3 will be set as 1 V like in the second method. Incidentally, it is preferred that this threshold be set with hysteresis as in the second method.

$$IR = P4 \geq TH3 \quad (3)$$

Incidentally, in the determination processing of image irregularity (ST15), the above-mentioned first to third methods may be carried out in combination as appropriate. In principle, it is preferred that all of such first to third methods be combined. However, some vehicles may not have a specific sensor, and in some cases, hardware may be simplified for cost reduction. In these cases, only any one or two of the first to third methods may be selected and carried out as appropriate.

As described above, with the display control apparatus 4 according to the presently filed embodiment, typically when the occurrence of an image irregularity is detected based on the signals from the speed sensor 40 and the steering angle sensor 30, the image before the occurrence of image irregularity can be displayed, so that any image having an irregularity is prevented from being displayed while, for example, the vehicle is turning.

Therefore, the difficulty of seeing and discomfort which the driver of the vehicle may have can be relieved. Further, as the image before the occurrence of image irregularity is displayed, the driver can be made to recognize how much the vehicle has turned compared to its previous position.

When the occurrence of an image irregularity is detected, the image having an irregularity can be displayed every predetermined time period, and consequently the image irregularity can be made less noticeable.

Also, when the occurrence of an image irregularity is detected, the brightness of the image having an image irregularity can be reduced, so that the image having an image irregularity can be made less noticeable. Further, reduced brightness makes the image having an image irregularity visible, thereby making it possible to inform the driver whether the display control apparatus 4 operates properly or not.

Also, when the occurrence of an image irregularity is detected, the display of an image taken during the image irregularity can be prohibited so that the image having an image irregularity will not be displayed, thereby enabling relief from the difficulty of seeing and discomfort which the driver of the vehicle may have. Further, the prohibition of the display of the image having an image irregularity allows the driver's actual field of view to be widened, for example, during vehicular turning.

Further, since an image irregularity can be detected based on the amount of vibrations detected by the vibration sensor 50, the irregular image can be prevented from being provided to the driver, for example, when he climbs a slope or drives on a rough road.

Moreover, since an image irregularity can be detected based on the amount of lateral fluctuation of the vehicle detected by the yaw rate sensor 60, the irregular image can be prevented from being provided to the driver when the vehicle goes into a skid due to a strong wind or the like.

Second Embodiment

Next, a display control apparatus for a vehicle and a method of controlling the same of a second embodiment according to the present invention will be described in detail, referring mainly to FIG. 5. The hardware configuration of the display control apparatus for the vehicle of the embodiment is the same as that of the first embodiment, but a determination processing of image irregularity in its basic processing is different from that of the first embodiment. Focusing attention on such a difference, the same components will be designated by the same reference numerals and some details will be omitted or simplified as appropriate in the description.

Figure 5:
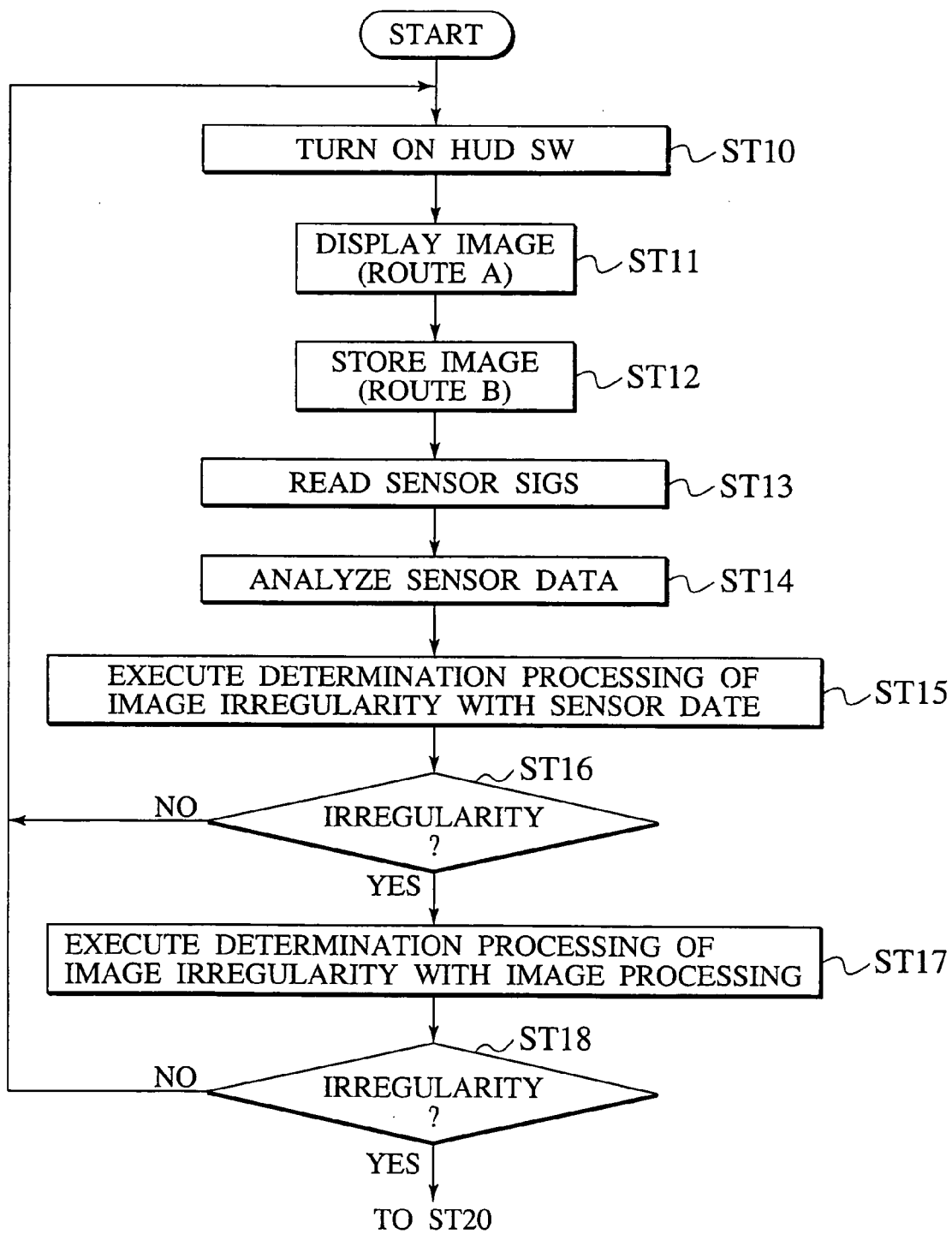
FIG. 5 is a flow chart showing a basic processing of a display system for a vehicle of a second embodiment according to the present invention.

As shown in FIG. 5, when the basic processing of the display control apparatus for the vehicle of the embodiment starts, the process goes through ST10 to ST16 to determination processing of image irregularity with image processing (ST17), not to the display control processing shown in FIG. 4. This determination processing of image irregularity uses the images obtained by image pick-up in addition to the signals from various sensors 30 to 60 to determine an image irregularity.

First, a first method of determining an image irregularity by such image processing will be described.

In the first method, several detecting points in the image plane obtained by image pick-up are provided and, based on these points, an image irregularity is determined by measuring the amount of change (travel distance or motion vector) of an object or the like between images. In this case, a threshold for the amount of change is preset and, based on whether the amount of the change that is detected exceeds the threshold or not, the image irregularity is determined.

Next, a second method of determining an image irregularity by image processing will be described.

In the second method, the outline of an object or the like in the image obtained by image pick-up is extracted and, based on the amount of change in the outline, an image irregularity is determined. Also in this case, a threshold for the amount of the change is preset and the same procedure as in the first method is used to determine an image irregularity. Additionally, in this case, it is possible to determine an image irregularity based on whether the outline extraction itself is possible or not.

Incidentally, in these first and second methods, an image irregularity is determined by calculating the amount of the change in the detecting points or outline based on the current image stored in the current image memory area 12b and a single or plural properly selected past images stored in the past image memory area 12a.

As a result, a determination is made as to whether the image stored in the current image memory area 12b has irregularity or not. When an image irregularity is detected, the processing as shown in FIG. 4 is executed (ST18) as in the first embodiment. When the processing as shown in FIG. 4 is completed, the process returns to ST10, wherein such a sequence of processes are repeated until, for example, the ignition switch is turned off.

On the other hand, when no irregularity is detected in the image stored in the current image memory area 12b, the process automatically returns to ST10 (ST18).

As described above, with the display control apparatus for the vehicle according to the embodiment, in addition to the determination of occurrence of an image irregularity based on signals from various sensors in the first embodiment, the occurrence of an image irregularity is determined also by image processing, and thus whether an image irregularity occurs or not can be determined more correctly.

Therefore, the display control of the presently filed embodiment can eventually be carried out more accurately when an image irregularity is detected. As a result, the difficulty of seeing and discomfort which the driver of the vehicle may have can be relieved more appropriately.

The entire content of a Patent Application No. TOKUGAN 2003-277679 with a filing date of Jul. 22, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A display system for a vehicle, comprising:
   a sensor sensing a motional state of a vehicle;
   an image pick-up device taking an image of an outside of the vehicle;
   a display displaying the image taken by the image pick-up device;
   a memory storing a first image taken by the image pick-up device at a first time and a second image taken by the image pick-up device at a second time which is past the first time;
   a determination section determining whether or not there is an image irregularity in the second image stored in the memory based on the motional state of the vehicle sensed by the sensor; and
   a display control section processing to allow the first image stored in the memory to be displayed on the display when the determination section determines that there is the image irregularity in the second image.

2. The display system according to claim 1, wherein the sensor includes a speed sensor sensing a speed of the vehicle, and a steering angle sensor sensing an amount of steering of the vehicle, and wherein the determination section determines whether or not there is the image irregularity in the second image based on the speed sensed by the speed sensor and the amount of steering sensed by the steering angle sensor.

3. The display system according to claim 1, wherein the sensor includes a vibration sensor sensing a vibration of the vehicle, and wherein the determination section determines whether or not there is the image irregularity in the second image based on the vibration sensed by the vibration sensor.

4. The display system according to claim 1, wherein the sensor includes a yaw rate sensor sensing a yaw rate of the vehicle, and wherein the determination section determines whether or not there is the image irregularity in the second image based on the yaw rate sensed by the yaw rate sensor.

5. The display system according to claim 1, wherein when the determination section determines that the image irregularity exists in the second image, an image processing is further executed with respect to a third image taken by the image pick-up device at a third time which is past the second time to determine the image irregularity in the third image.

6. A display system for a vehicle, comprising:
   a sensor sensing a motional state of a vehicle;
   an image pick-up device taking an image of an outside of the vehicle;
   a display displaying the image taken by the image pick-up device;

a determination section determining whether or not there is an image irregularity in the image taken by the image pick-up device based on the motional state of the vehicle sensed by the sensor; and a display control section processing with respect to the image containing the image irregularity when the determination section determines that there is the image irregularity in the image, wherein when the determination section determines that the image irregularity exists in the image, which is taken by the image pick-up device at a first time, an image processing is further executed with respect to a second image taken by the image pick-up device at a second time which is past the first time to determine the image irregularity in the second image.

7. The display system according to claim 6, further comprising a memory storing the image taken by the image pick-up device, wherein when the determination section determines that the image irregularity exists in the image, the image containing the image irregularity stored in the memory is displayed on the display at predetermined time intervals until the determination section determines that the image irregularity does not exist any more.

8. The display system according to claim 6, wherein when the determination section determines that the image irregularity exists in the image, the image containing the image irregularity is displayed on the display while being reduced in a displaying brightness of the image.

9. The display system according to claim 6, wherein when the determination section determines that the image irregularity exists in the image, the image containing the image irregularity is prohibited from being displayed on the display.

10. The display system according to claim 6, wherein the sensor includes a speed sensor sensing a speed of the vehicle, and a steering angle sensor sensing an amount of steering of the vehicle, and wherein the determination section determines whether or not there is the image irregularity in the image based on the speed sensed by the speed sensor and the amount of steering sensed by the steering angle sensor.

11. The display system according to claim 6, wherein the sensor includes a vibration sensor sensing a vibration of the vehicle, and wherein the determination section determines whether or not there is the image irregularity in the image based on the vibration sensed by the vibration sensor.

12. The display system according to claim 6, wherein the sensor includes a yaw rate sensor sensing a yaw rate of the vehicle, and wherein the determination section determines whether or not there is the image irregularity in the image based on the yaw rate sensed by the yaw rate sensor.

13. A method of controlling a display system for a vehicle comprising:

detecting a motional state of a vehicle;

picking up an image of an outside of the vehicle;

determining whether or not there is an image irregularity in the image based on the motional state of the vehicle; and executing display processing to display one of the image containing the image irregularity and another image previously picked up and not containing the image irregularity, on a display, when the image is determined as having the image irregularity.

* * * * *